US010029379B2

(12) United States Patent
Goulimis

(10) Patent No.: US 10,029,379 B2
(45) Date of Patent: Jul. 24, 2018

(54) PATTERN TRANSFORMATION

(71) Applicant: Greycon Ltd., London (GB)

(72) Inventor: Constantine Goulimis, London (GB)

(73) Assignee: Greycon Ltd., London (GB)

( * ) Notice: Subject to any disclaimer, the term of this patent is extended or adjusted under 35 U.S.C. 154(b) by 430 days.

(21) Appl. No.: 15/000,474

(22) Filed: Jan. 19, 2016

(65) Prior Publication Data

US 2017/0203457 A1 Jul. 20, 2017

(51) Int. Cl.
*B26D 5/00* (2006.01)
*G05B 19/402* (2006.01)

(52) U.S. Cl.
CPC .......... *B26D 5/005* (2013.01); *G05B 19/402* (2013.01); *G05B 2219/49372* (2013.01)

(58) Field of Classification Search
CPC ................. B26D 5/005; G05B 19/402; G05B 2219/49372
USPC .......................................................... 700/171
See application file for complete search history.

(56) References Cited

U.S. PATENT DOCUMENTS 5,235,508 A * 8/1993 Lirov .................... G06Q 10/043
700/99

* cited by examiner

*Primary Examiner* — Robert E Fennema
*Assistant Examiner* — Marzia T Monty
(74) *Attorney, Agent, or Firm* — Kilpatrick Townsend & Stockton

(57) ABSTRACT

Disclosed herein is a method for transforming cutting data for configuring a cutting machine for a cutting process. The method comprises a computing device: obtaining first cutting data that comprises patterns and an associated multiplicity of each pattern, wherein the multiplicity of a pattern is the number of times the pattern is repeatedly used in a cutting process; and transforming the first cutting data into second cutting data, wherein the number of patterns comprised by the second cutting data is less than the number of patterns comprised by the first cutting data; wherein each pattern comprises a plurality of items and the widths of the items in a pattern define knife positions of a cutting machine during a cutting process; and transforming the first cutting data into second cutting data comprises the steps of: determining a subset of patterns; searching for a new seed pattern, wherein the new seed pattern comprises items within the subset of patterns and the new seed pattern has a larger multiplicity than at least one of the patterns in the subset of patterns; searching, in response to finding a new seed pattern, for a plurality of further patterns comprising all of the items of the subset other than those used by the new seed pattern such that said new seed pattern and said further patterns consist of all of the items of the subset of patterns and the total number of patterns comprised by said new seed pattern and said further patterns is less than the total number of patterns in the subset of patterns; and generating second cutting data that comprises said new seed pattern and said further patterns as well as the patterns that were not included in the subset of patterns. Advantageously, applying the transformation according to embodiments reduces the number of patterns in the cutting data and thereby increases the efficiency of a cutting operation.

28 Claims, 5 Drawing Sheets

PATTERN TRANSFORMATION

FIELD

The present invention relates to the determination of patterns for defining a cutting operation. A transformation of cutting data is performed in order to reduce the number of patterns and thereby increase the efficiency of a cutting operation.

BACKGROUND

Sheet materials such as paper and film are manufactured industrially as large reels. These large reels are characterised by their width and their length. In a separate industrial process from the manufacture of the reels of sheet material, the large reels are cut into smaller reels for use in variety of applications. The smaller reels are all cut to the same length but differ in width due to different applications requiring different widths of the material.

A commercially available industrial machine for cutting a large reel of material into smaller reels is the Atlas CW1040 Series Primary Slitter Rewinder.

The cutting process of the large reel from the manufacturing process into smaller reels is dependent on what the present demand for each of the widths of the smaller reels is. Accordingly, the machine needs to be configured prior to each and every cutting operation in order for appropriate quantities of each of the differing widths of smaller reels of material to be produced. During a cutting operation, knives of the cutting machine are arranged to simultaneously cut the material from the large reel into a plurality of reels of material with smaller widths. The arrangement of the knives to cut material from a large reel into a plurality of smaller reels is referred to as a pattern. Each of the smaller reels is cut to the same length. A cutting pattern is therefore repeatedly used in a cutting operation until the desired quantity of smaller reels of particular widths has been produced. The cutting pattern is then changed so that smaller reels of different widths can be produced from the same large reel.

A cutting operation of a single large reel of material into a plurality of smaller reels will typically require about 25 different patterns but may require up to 80 patterns or more. In order to change between patterns during a cutting operation, it is necessary to stop the operation of the cutting machine and then for the knife positions to be manually changed by machine operators. The changing of patterns, i.e. the knife positions, is therefore a slow process that reduces the efficiency of the cutting operation.

When configuring a cutting machine prior to a cutting operation, a plurality of patterns need to be calculated to ensure that the desired quantities of smaller reels will be produced. The primary consideration when determining the patterns is usually to minimise wastage of the material being cut. An important further consideration is to reduce the number of patterns required in order to reduce the inefficiency caused by pattern changes.

The generation of patterns with the specific goal of minimising wastage of the material is referred to as the one-dimensional cutting stock problem, 1D-CSP. The problem is one dimensional due to the variable nature of the widths of the smaller reels. It is not a two dimensional problem as the lengths of the smaller reels is fixed. Finding and improving solutions to the 1D-CSP is an old mathematical problem that is a subject of continued research. It is well known that the 1D-CSP is quite degenerate, i.e. multiple different solutions with the same waste often exist. This can be explained by geometrical re-arrangement, i.e. it is sometimes possible, for example, to swap two items belonging to different patterns, creating new patterns in the process.

The pattern reduction problem is treated as an independent problem from the 1D-CSP. That is to say, after patterns that are a solution to the 1D-CSP have been found in order to minimise wastage of the material being cut, a separate process is performed to reduce the number of patterns. The pattern reduction problem is a harder problem to solve than the 1D-CSP. The problem has been shown to be to be NP-hard. In Aldridge, C. et al., Pattern Reduction in Paper Cutting. European Study Group with Industry, (pp. 1-15). Oxford, 1996, a special class of the 1D-CSP is considered where each pattern contains at most two items. For this class, the first-fit-decreasing rule gives an optimal answer to the minimum waste problem. So, the waste minimisation problem is easy. However, the corresponding pattern minimisation problem for this class has been shown to be strongly NP-hard. Part of the difficulty of the pattern minimisation problem is that good lower bounds are difficult to find. If the number of different widths of smaller reels, i.e. item sizes, is d, linear programming indicates that there will be approximately d patterns in an optimal solution to the 1D-CSP. However, trivial examples can be constructed where d distinct sizes have a one-pattern minimum waste solution. This process generalises so that for any m, $1 \le m \le d$, examples can be produced where the minimum waste solution has no more than m patterns. FIG. 1 shows the construction for m=2: Also, only one easy lower bound is known in the literature; this adds one instance of each item and divides the sum by the master size. For the above example, this bound is 2, regardless of p & q. This trivial lower bound, is so weak in practice as to be almost useless. Alves, C. et al., New lower bounds based on column generation and constraint programming for the pattern minimization problem, Computers & Operations Research, 2944-2954, 2009, provides stronger bounds based on a combination of column generation and constraint programming. However, these are non-trivial to implement, even in the absence of additional practical constraints.

Three broad approaches are known for minimising the number of patterns. The first approach controls the number of patterns during the solution of the 1D-CSP. Within this class, one sub-approach solves a multi-objective optimisation problem, see for example: Haessler, R. W., Controlling Cutting Pattern Changes in One-Dimensional Trim Problems. Operations Research, 483-493, 1975; Moretti, A. C., & Neto, L. D., Nonlinear Cutting Stock Problem to Minimize the Number of Different Patterns and Objects. Computational & Applied Mathematics, 1-18, 2008; Cerqueira, G. R., & Yanasse, H. H., A pattern reduction procedure in a one-dimensional cutting stock problem by grouping items according to their demands. Journal of Computational Interdisciplinary Sciences, 159-164, 2009; Kallrath, J., Rebennack, S., & Kallrath, J., Solving real-world cutting stock-problems in the paper industry: Mathematical approaches, experience and challenges. European Journal of Operational Research, 374-389, 2014; and Sykora, A. M., Potts, C., Hantanga, C., Goulimis, C. N., & Donnelly, R., A Tabu Search Algorithm for a Two-Objective One-Dimensional Cutting Stock Problem. 12th ESICUP Meeting. Portsmouth, 2015. Whilst powerful, these face two challenges: (a) determining robustly the trade-off of waste vs. pattern count and (b) implementing the various practical pattern constraints is difficult and sometimes impossible.

The second approach uses an exact optimisation algorithm to solve a suitable integer programming formulation, which can range from a mixed-binary/integer formulation with a generic commercial solver to custom advanced algorithms, see for example: Vanderbeck, F., Exact Algorithm for Minimising the Number of Setups in the One-Dimensional Cutting Stock Problem. Operations Research, 915-926, 2000; and Belov, G., & Scheithauer, G., The number of setups (different patterns) in one-dimensional stock cutting. Dresden: Department of Mathematics, Dresden University of Technology, 2003. Although this approach can deliver improvements, it remains computationally demanding for practical problems, in particular for solutions that require more than 25 patterns.

The complexity of the first and second approaches described above, require respective computation times of 2 hours and ½ hour or longer. Even allowing for improvements in hardware such computation times are not acceptable. For example, an order may be changed at the last minute and a substantially instantaneous recalculation of the patterns will be required. Moreover, the inclusion of the practical constraints is problematic.

The third approach involves taking an existing minimum waste solution and then applying a series of fast transformations, each of which maintains the original order allocation and run length (and therefore the waste), but reduces the pattern count. These are transformation heuristics. The first such heuristic, referred to as the 2:1 rule, was described in Johnston, R. E., Rounding algorithms for cutting stock problems. Asia Pacific Journal of Operations Research, 166-171, 1986. This provides necessary and sufficient conditions for two patterns to be combined into one. The pattern reduction is calculated from specific detected conditions.

This was followed by the staircase heuristic as described in Goulimis, C. N., Optimal solutions for the cutting stock problem. European Journal of Operational Research, 197-208, 1990. This looks for pattern triplets of the form shown in FIG. 2A. In FIG. 2A, the labelled blocks each contain one or more of the required items. This form can be transformed to that shown in FIG. 2B subject to the new pattern (consisting of A+D) being feasible. In FIGS. 2A and 2B there is therefore a transformation of three patterns into two. The pattern reduction is achieved by searching for better solutions that may or may not exist.

These two heuristics, which both require trivial computational effort, can be applied exhaustively to any starting solution until no further improvement can be found. Their usefulness in practice is immense. There are situations in which a minimum waste solution with 28 patterns is reduced by the 2:1 rule to 26 patterns. Applying the staircase heuristic reduces the number of patterns to just 9.

Over the years additional transformation heuristics have been published, culminating in the KOMBI family in Foerster, H., & Wascher, G., Pattern reduction in one-dimensional cutting stock problems. International Journal of Production Research, 1657-1676, 2000. This looks at triples and quadruples and applies a recursive procedure. All the transformation heuristics published so far have the same structure, they examine subsets of cardinality s where s depends on the heuristic and $2 \leq s \leq 5$. Each may be embedded in a parallelisable loop that examines potentially all $\binom{n}{s}=O(n^s)$ combinations for a starting solution with n patterns. This poses a computational challenge when the number of initial patterns starts exceeding 50. For example, $\binom{50}{5} \approx 2$ million quintuples.

Transformation heuristics offer the following advantages over the other approaches:
   The waste and allocation aspects of the starting solution remain unchanged;
   They can easily accommodate practical constraints; and
   They are not computationally demanding and therefore generate improvements very quickly.

Although transformation heuristics are valuable in reducing the pattern count, they remain severely suboptimal. All known transformation heuristics involve examining small subsets of the solution patterns, with cardinality up to 4 or 5.

In addition, solutions need to be found that are consistent with practical constraints. There are very many different pattern constraints because the machinery for cutting, and operation of the machinery, is by no means standardised. Common practical constraints include:

1. Minimum width: patterns of total size below a user-specified minimum are unacceptable.

2. Knives: the maximum number of items in a pattern is constrained by the number of available slitting knives.

3. Small/big items: the user defines certain items as small/big and places constraints on the minimum/maximum number of instances of each class.

4. Occurrences: each item may have restrictions on the number of times it appears in each pattern. The most common of these is the multi-pack constraint, where the occurrences must be a multiple of a user-specified value (e.g. the pattern can contain 0/3/6/ . . . instances of an item, but 1 or 4 occurrences are not allowed).

5. Distinct: patterns may not contain items with similar size; this is encountered in situations where knife placement or labelling is manual and operators cannot be relied on to distinguish very similar sizes.

6. Minimum pattern multiplicity: in some cases there is a minimum run length for each pattern.

A related consideration is that machine operators particularly dislike singleton patterns that are only used once. Given two solutions with same overall pattern count, the one with the fewest singleton patterns is therefore preferable.

These constraints create difficulties in column generation and other decomposition algorithms for the main 1D-CSP. It is no longer sufficient to solve a pure knapsack as the auxiliary problem. The constraints cause the same difficulties in the pattern minimisation.

Transformation heuristics are not only computationally efficient but are appropriate for finding solutions to practical constraints such as those listed above. Accordingly, known approaches to generating patterns for use in a cutting operation first calculate a solution that minimises the wastage of the material being cut and then apply the above-described transformation heuristics to reduce the pattern count.

There is a need to improve known techniques for generating patterns for use in a cutting operation.

SUMMARY OF THE INVENTION

According to a first aspect of the invention, there is provided a method of transforming cutting data for configuring a cutting machine for a cutting process, the method comprising a computing device: obtaining first cutting data that comprises patterns and an associated multiplicity of each pattern, wherein the multiplicity of a pattern is the number of times the pattern is repeatedly used in a cutting process; and transforming the first cutting data into second cutting data, wherein the number of patterns comprised by the second cutting data is less than the number of patterns comprised by the first cutting data; wherein each pattern comprises a plurality of items and the widths of the items in a pattern define knife positions of a cutting machine during a cutting process; and transforming the first cutting data into second cutting data comprises the steps of: determining a subset of patterns; searching for a new seed pattern, wherein the new seed pattern comprises items within the subset of patterns and the new seed pattern has a larger multiplicity than at least one of the patterns in the subset of patterns; searching, in response to finding a new seed pattern, for a plurality of further patterns comprising all of the items of the subset other than those used by the new seed pattern such that said new seed pattern and said further patterns consist of all of the items of the subset of patterns and the total number of patterns comprised by said new seed pattern and said further patterns is less than the total number of patterns in the subset of patterns; and generating second cutting data that comprises said new seed pattern and said further patterns as well as the patterns that were not included in the subset of patterns.

Preferably, the method further comprises reducing the number of patterns in the second cutting data by repeatedly applying said transformation steps to one or more subsets of generated second cutting data.

Preferably, said step of determining a subset of patterns comprises determining patterns to be included in the subset of patterns in dependence on the multiplicity of the patterns.

Preferably, said step of determining a subset of patterns comprises determining patterns to be included in the subset of patterns in dependence on all of the patterns having the same multiplicity.

Preferably, said step of determining a subset of patterns comprises: determining patterns to be included in the subset of patterns in dependence on patterns having the same multiplicity; and in dependence on one or more patterns with larger multiplicity than the patterns with the same multiplicity.

Preferably, the subset comprises a plurality of patterns with the same multiplicity and only one pattern with a larger multiplicity.

Preferably, said step of determining a subset of patterns comprises determining the patterns with the lowest multiplicity to be included in the subset of patterns.

Preferably, the method further comprises: applying a transformation to a first subset of patterns with a first multiplicity; applying a transformation to one or more further subsets of patterns, wherein all of the subsets of patterns have different multiplicities; and generating the second cutting data in dependence on the applied transformations to the plurality of subsets of patterns.

Preferably, the method further comprises applying the transformations to the plurality subsets of patterns in a parallel computing process.

Preferably, the transformation further comprises determining if said further patterns comprise the same pattern more than once and/or the same pattern as said new seed pattern; and merging any patterns that are determined to be the same to generate a single pattern with larger multiplicity than that of the same patterns.

Preferably, the transformation further comprises applying one or more additional transformations.

Preferably, the additional transformations include one or both of the 2:1 transformation and staircase transformation.

Preferably, searching for a new seed pattern comprises using a knapsack algorithm.

Preferably, searching for a plurality of further patterns comprises using a bin packing algorithm.

Preferably, the method further comprises: receiving the first cutting data; and outputting the second cutting data.

Preferably, the method further comprises receiving cutting parameters that comprise the width of a material to be cut during the cutting process and the widths and quantities of items that the material is to be cut into; and generating first cutting data in dependence on the received cutting parameters.

Preferably, the first cutting data is generated in dependence on an algorithm for minimising the wastage of the material being cut.

Preferably, the first cutting data has been transformed by the 2:1 transform and/or the staircase transform.

Preferably, the material is paper, film or fabric.

Preferably, the multiplicity of the patterns in the subset of patterns is one.

Preferably, searching for a new seed pattern comprises first searching for a seed pattern that has a maximum potential multiplicity; and searching for seed patterns with sequentially lower multiplicity in the event that a plurality of further patterns comprising all of the items of the subset other than those used by the new seed pattern, such that said new seed pattern and said further patterns consist of all of the items of the subset of patterns and the total number of patterns comprised by said new seed pattern and said further patterns is less than the total number of patterns in the subset of patterns, is not found.

Preferably, the subset is either: a subset of the patterns comprised by the first cutting data and the subset comprises less patterns than the number of patterns comprised by the first cutting data; or a subset of patterns comprised by second cutting data generated by a previous transformation and the subset comprises less patterns than the number of patterns comprised by the second cutting data.

Preferably, the method further comprises stopping a transformation after a predetermined time has elapsed since the transformation started.

Preferably, the method further comprises determining to stop all current transformations and to not perform further transformations on cutting data after a predetermined time has elapsed since a first transformation was started.

Preferably, the method further comprises determining to stop all current transformations and to not perform further transformations on cutting data when a predetermined reduction in the number of patterns comprised by the cutting data has been reached.

Preferably, the transformation of the first cutting data into second cutting data provides the same quantities of each item in the second cutting data as in the first cutting data.

Preferably, the wastage of material as a result of a cutting operation that is performed according to the first cutting data is the same as the wastage of material as a result of a cutting operation performed according to the second cutting data.

Preferably, the new seed pattern has a larger multiplicity than all of the patterns in the subset of patterns;

According to a second aspect of the invention, there is provided a method of operating a cutting machine comprising: receiving a reel of material to be cut; obtaining cutting data that has been generated in dependence on the method according to the first aspect; configuring the machine with the obtained cutting data; and operating the configured machine to cut said reel into a plurality of smaller reels in dependence on the obtained cutting data.

According to a third aspect of the invention, there is provided a computing device configured to automatically perform the method of the first aspect.

According to a fourth aspect of the invention, there is provided a cutting machine for cutting a reel of material into a plurality of smaller reels of material, wherein the cutting machine is configured to: receive cutting data from a computing device according to the third aspect; and cut a reel of material into a plurality of smaller reels in dependence on the cutting data.

A cutting system comprising a cutting machine according to the fourth aspect and a computing device according to the third aspect.

LIST OF FIGURES

DESCRIPTION OF EMBODIMENTS

Figure 1:
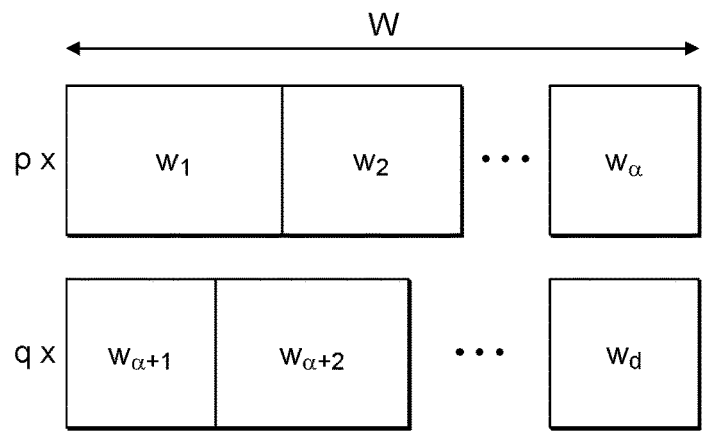
FIG. 1 illustrates cutting data that comprises an arrangement of items within patterns.
Figure 2A:
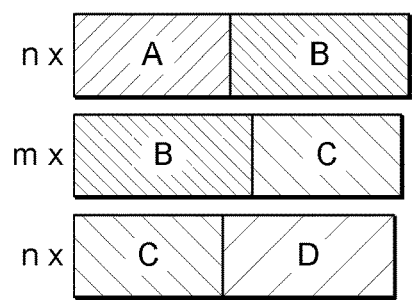
FIGS. 2A and 2B illustrate a transformation of items within patterns.
Figure 2B:
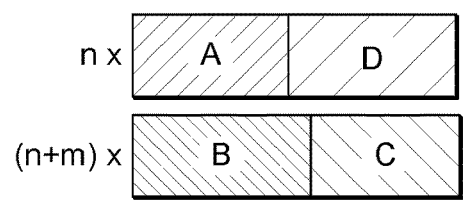

Embodiments of invention provide a new transformation heuristic for reducing the number of patterns in a cutting operation. The transformation is not computationally demanding and can be quickly applied. The transformation according to embodiments may be applied in addition to the known 2:1 and staircase transformation heuristics as well as other transformation heuristics.

Cutting data according to embodiments comprises a plurality of patterns. Each pattern has a multiplicity which is the number of times the pattern is repeatedly used in a cutting operation. Each pattern comprises a plurality items that represent the cut products of a cutting operation. The item widths define the knife positions during a cutting process. All items are cut to the same length during a cutting operation.

The transformation heuristic according to embodiments is referred to as the KBP heuristic and implemented as an algorithm. It works in a different manner to known heuristics and is capable of examining larger subsets that have a specific structure. As with all transformation heuristics, the input to the transformation is an existing solution, i.e. a set of patterns for use in a cutting operation. The KBP heuristic/algorithm searches for an equivalent solution with fewer patterns so as to increase the efficiency of the cutting operation.

The operation of the KBP heuristic according to embodiments uses a new subset selection technique together with existing fast algorithms for solving the knapsack and bin-packing problems in order to search for a reduction in the pattern count.

Embodiments demonstrating how the transformation works are described below. A simplified version of the heuristic is described first and then the heuristic is described in a generalised form.

There is always an initial operation of determining a subset of patterns within existing cutting data. The transformation according to embodiments is applied to only the subset of patterns.

In the present embodiment, the subset of patterns is taken from an existing set of patterns for use in a cutting operation and the subset comprises all of the patterns with the same lowest multiplicity of one. More particularly, suppose that an existing solution contains m patterns, where m≥3, and the patterns have a common multiplicity of one, i.e. each of the m patterns is produced exactly once. These m patterns will consume m master items. The transformation according to the present embodiment searches for a set of m−1 patterns. The searched for solution satisfies exactly the same items, i.e. there is a total of m master items; and the wastage remains the same. A new set of patterns that provide a solution will have the structure that one pattern will be produced twice and the (m−2) remaining patterns will be produced once. The number of patterns is therefore reduced.

By way of notation, we index the items satisfied by these m patterns by i; the width of item i is $w_i$ and the quantity supplied by this collection of m patterns is $q_i$.

We observe that $q_i \geq 1$ (by construction). As shown in FIG. 1, the maximum allowable width of a pattern is W.

The present embodiment of the transformation has two steps:

Step 1

The first step involves constructing a seed pattern that can be produced twice. A bounded knapsack is preferably used:

$$\max z = \Sigma_i w_i x_i$$

subject to:

$$\sum_i w_i x_i \leq W \quad \text{(Eqn. 1)}$$

$$x_i \leq \lfloor qi/2 \rfloor, x_i \in \mathbb{N}$$

This value-independent knapsack is solved in effect over the subset of the items that are produced at least twice. The resulting solution to the knapsack is therefore a new pattern, referred to as a seed pattern, which can be produced twice.

Step 2

This step is performed by the algorithm in response to Step 1 finding that at least one pattern that can be produced twice. Step 2 determines whether the remaining items can be put into m−2 patterns. This involves solving a bin-packing problem on the remaining items, so taking advantage of the fact that when the pattern multiplicity is one, the concept of a bin and a pattern merge. If the solution to the bin packing problem consumes m−2 bins or less, then a solution has been found.

When the knapsack has multiple solutions, which will often be the case, each solution is examined in turn, until either all possibilities for a solution are exhausted or a solution that provides a reduction in the number of patterns is found.

Provided below is an example demonstrating the present embodiment. The master item has size 2725 and there are no additional constraints. The six patterns with multiplicity one are:

1×: 925+875+550+375
1×: 1250+575+450+450
1×: 750+725+675+575
1×: 1100+650+550+425
1×: 950+925+425+425

1×: 725+550+500+485+450

Figures 3, 4:
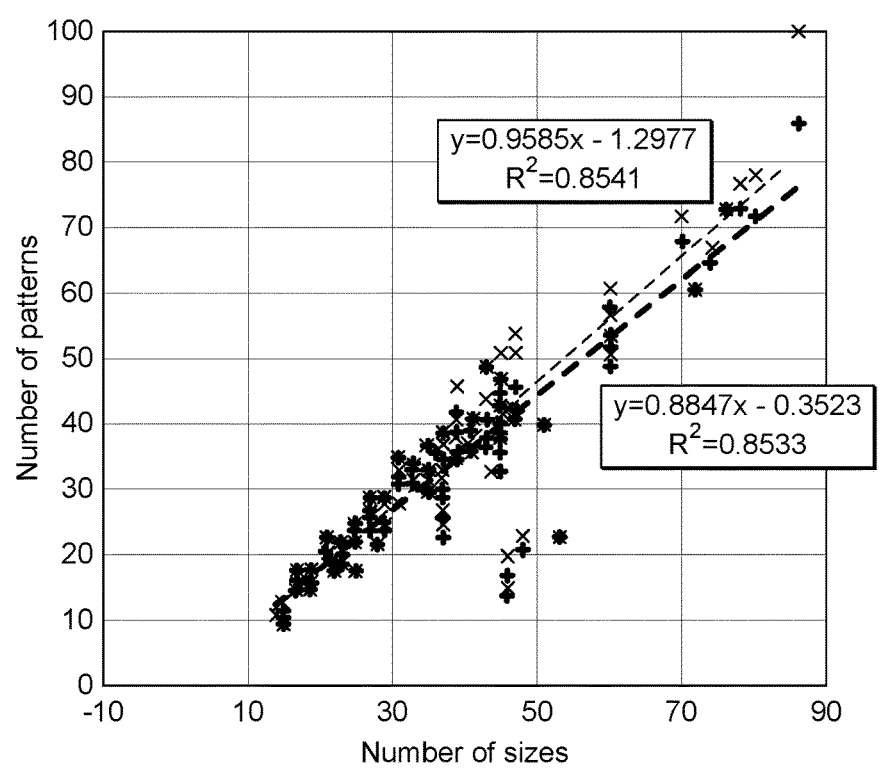
FIG. 3 illustrates a subset of cutting data, according to an embodiment, that comprises an arrangement of items within patterns.
FIG. 4 shows performance results of algorithms according to embodiments.

This is shown graphically in FIG. 3.

This solution is not reducible by any known transformation heuristics, including the 2:1 and staircase transformation heuristics. There are 129 possible patterns in this case. The trivial lower bound on the number of cutting patterns is $\lceil 4.1 \rceil = 5$.

The items that appear more than once, and therefore items that may potentially be used to form a new seed pattern, are:

| $w_i$ | $q_i$ |
|---|---|
| 425 | 3 |
| 450 | 3 |
| 550 | 3 |
| 575 | 2 |
| 725 | 2 |
| 925 | 2 |

One solution to the knapsack of size 2725 from the above items is 725+575+550+450+425 (=2725). This is therefore taken as a candidate seed pattern to be produced twice.

Bin packing the remaining items into four bins of size 2725 is possible, yielding this overall solution:
1×: 1250+650+450+375
1×: 1100+950+675
1×: 925+875+485+425
1×: 925+750+550+500
2×: 725+575+550+450+425

This solution achieves the trivial lower bound, so no further improvements are possible. The two solutions have no common patterns. This implies that this particular reduction would not have been found by any known transformation heuristic as such known transformation heuristics examine tuples up to size five.

Accordingly, the above described embodiment provides a new technique for reducing the number of patterns required for a cutting operation. The wastage of material remains unchanged from that calculated by any known algorithm for minimising wastage of material during the cutting process.

Advantageously, the number of patterns is reduced by the transformation and the efficiency of a cutting operation that uses the transformed data is therefore increased.

Embodiments include a number of generalisations to the embodiment of a transformation heuristic as described above.

A first generalisation according to an embodiment allows the seed pattern to be produced p times, $p \geq 2$. The only difference to the knapsack formulation in order to look for a pattern produced p times is that $m \geq p$ and Eqn. 1 is modified to:

$$x_i \leq \lfloor q_i/p \rfloor, x_i \in N$$

The remaining problem is still solvable by bin-packing. A seed pattern produced p times implies a reduction to m−p+1 patterns. The likelihood of finding such a reduction decreases with increasing p. Given the desirability of high values of p, the KBP algorithm according to embodiments starts with the highest possible value of p ($=\max \{q_i\}$) and progressively examines all lower values down to p=2.

In the above example there are clearly no solutions for $p \geq 4$. For p=3 the only solution to the knapsack has too much waste (or, equivalently, the bin-packing is not solvable within 6−3=3 bins).

Below is an example with p=3 that improves the following initial subset of cutting patterns with m=13:
1×: 1625+1490+1250+1235
1×: 1625+1625+1430+920
1×: 1790+1310+1250+1250
1×: 1800+1500+1250+1050
1×: 1805+1430+1430+935
1×: 1895+1235+1235+1235
1×: 1895+1865+920+920
1×: 1970+1385+1190+1050
1×: 1970+1385+1310+935
1×: 2060+2030+15000
1×: 2120+1865+1610
1×: 2250+2030+1310
1×: 2270+1475+935+920

The reduced solution has 11 patterns (10 new ones and one unchanged):
1×: 1800+1500+1250+1050
1×: 1895+1895+1805
1×: 1970+1790+920+920
1×: 1970+1500+1190+935
1×: 2030+1385+1250+935
1×: 2030+1385+1250+935
1×: 2060+1250+1235+1050
1×: 2120+1865+1610
1×: 2250+1865+1475
1×: 2270+1490+920+920
3×: 1625+1430+1310+1235

In the above solution the $5^{th}$ and $6^{th}$ patterns are the same as each other. The transformation therefore checks for patterns that are the same after the transformation and performs a merge operation to create one less pattern, for a total of 10. Even further reductions may be possible by the merge operation as any of the new patterns may also exist in the rest of the solution, i.e. the patterns not included in the subset, which is also checked for patterns that are the same.

A further generalisation according to embodiments allows suboptimal solutions to the knapsack, provided their waste, when the associated pattern is produced p times, is not more than the original sub-problem's. Specifically, if the waste of the original solution is L, then we can restrict the width of the seed pattern to the range:

$$[\lceil W-L/p \rceil, W] \qquad \text{(Eqn. 2)}$$

The classical dynamic programming approach for solving the knapsack yields additional suboptimal patterns at no additional cost. Below is an example with 11 starting patterns and a master size of 5350:
1×: 1320+1070+1025+1025+910
1×: 1595+1205+850+850+850
1×: 1725+1445+1325+850
1×: 1770+1225+1175+1175
1×: 1810+1445+1225+870
1×: 1845+1750+1750
1×: 1960+1875+1515
1×: 1960+1940+1445
1×: 2035+1900+1415
1×: 2075+1900+1375
1×: 2120+1940+1290

The suboptimal seed pattern (1960+1940+1445) has width 5345; the reduction is to:
1×: 1415+1325+1320+1290
1×: 1770+1445+1225+910
1×: 1810+1515+1175+850
1×: 1875+1750+1725
1×: 1900+1205+1175+1070
1×: 1900+1750+850+850
1×: 2035+1595+870+850
1×: 2075+1225+1025+1025
1×: 2120+1845+1375

2×: 1960+1940+1445

The effect of these two generalisations is that the algorithm according to embodiments takes a solution subset consisting of m patterns with multiplicity one and, if the search for other solutions is performed for long enough, will always find an equivalent solution with fewer patterns if such a solution exists.

The above advantage of embodiments is given in the following lemma.

Lemma:

When reducing m patterns with multiplicity one, the KBP algorithm according to embodiments will find a reduction if one exists.

Proof:

The proof is based on the pigeonhole principle: any reduction will involve at least one pattern produced more than once. The exhaustive seed pattern generation, with width in the range given by Eqn. 2, will necessarily find it.

The fact that the bin-packing is solved to optimality then ensures that the feasible space is completely searched.

If the bin packing problem is solved to optimality for all candidate seed patterns (as opposed to terminating a reduction is first found), the algorithm is not only guaranteed to find a reduction, but it will find a maximal one, i.e. one with the maximum value of p. The reduced problem (what is left after a seed pattern with maximum multiplicity p* has been removed) consists of m−p*+1 patterns with multiplicity one. The process can therefore repeat.

The algorithm according to embodiments is not limited to searching for solutions among a subset of patterns with a multiplicity of one. Embodiments include the subset being determined as patterns having any common multiplicity. Preferably, the subset is determined to comprise the patterns with the lowest common multiplicity of the patterns of an existing solution.

Accordingly, embodiments include the following generalisation of the algorithm. Where the m initial patterns have (common) multiplicity k>1. The seed pattern will then have multiplicity p×k.

Below is an example with m=9:
3×: 1670+1670+1265+995
3×: 1940+995+900+900+850
3×: 2000+1535+1070+995
3×: 2000+1610+995+995
3×: 2105+2000+1475
3×: 2135+1475+995+995
3×: 2165+1655+890+890
3×: 2195+1265+1070+1070
3×: 2195+1535+935+935

This is reduced by the algorithm according to embodiments to the following 8 patterns:
3×: 1475+1265+1070+900+890
3×: 1610+995+995+995+995
3×: 2000+1670+995+935
3×: 2105+1670+935+890
3×: 2165+1940+1475
3×: 2195+1655+900+850
3×: 2195+2135+1265
6×: 2000+1535+1070+995

This generalisation allows an arbitrary 1D-CSP solution to decompose into separate sub-problems, one for each distinct value of the pattern multiplicity k. These sub-problems are not independent (the output of one may be used as the input to another), but can be examined in parallel with a 'first-past-the-post' strategy. The number of these sub-problems is equal to the number of distinct multiplicity values, a number bounded by n and therefore much smaller than the $\binom{n}{s}$ of the other known transformation heuristics.

Preferably, the above described algorithms according to embodiments are performed for subsets of patterns with each subset of patterns comprising patterns with the same multiplicity and the different subsets of patterns comprising patterns with different multiplicities. Preferably the different subsets of patterns are processed by algorithms according to embodiments in a parallel computing process.

A further generalisation of the algorithm according to embodiments is described below. The embodiment is more effective at reducing the number of patterns than the previously described embodiments. The embodiment differs from the above-described embodiments by the way in which the subset is determined.

The subset is not restricted to all of the patterns in the subset having the same multiplicity.

Consider the situation where, in the starting solution, in addition to the m patterns with a common multiplicity, that in the present embodiment is one, a further pattern is 'borrowed' from the rest of the solution to provide an extra pattern (called surplus) with multiplicity q≥2. The total number of master items is therefore m+q. The algorithm searches, again using the knapsack, for a seed pattern with multiplicity q+p, p≥1. If such seed pattern(s) are found, the remaining items have to fit into (m+q−(q+p)=m−p) bins. This is the same bin packing problem as before.

More generally, embodiments include an algorithm for transforming any subset of patterns that comprises:
m patterns with multiplicity k
1 pattern with multiplicity k×q
where m 3, 1 and q=0, 2, 3, 4, . . . .

The embodiment searches for an equivalent solution with fewer patterns as follows:
m−p patterns with multiplicity k
1 pattern with multiplicity k×(q+p)

Below is an example of a reduction involving a surplus pattern that is the first pattern. The 9-pattern starting solution has k=2:
4×: 2135+1730+1730
2×: 1550+1550+1550+950
2×: 1670+1355+1355+1220
2×: 1730+1355+1355+1160
2×: 1955+1730+1115+800
2×: 2105+1265+1265+965
2×: 2105+1355+1070+1070
2×: 2135+2105+1355
2×: 2300+1250+1250+800

The reduced solution, provided below, has 8 patterns. The seed pattern is the final pattern and p=1. Also note that, by chance, the second and third patterns below are the same and can be merged to reduce the patterns further:
2×: 1670+1550+1220+1160
2×: 1730+1355+1265+1250
2×: 1730+1355+1265+1250
2×: 1730+1550+1355+965
2×: 1730+1730+1070+1070
2×: 1955+1730+1115+800
2×: 2300+1550+950+800
6×: 2135+2105+1355

The inclusion of such a surplus pattern in the subset increases the computational complexity as the search space is larger. The number of sub-problems to be solved by iterations over surplus patterns from the remaining patterns becomes $O(n)$. This is still an improvement over the $O(n^s)$, $s \geq 2$ number of sub-problems encountered by known transformation heuristics.

A further generalisation of the algorithm according to embodiments extends the idea of using one surplus pattern to two or more. Consider a starting solution with structure:
  m patterns with multiplicity one
  1 pattern with multiplicity $q_1$
  1 pattern with multiplicity $q_2$
where $q_1 \geq q_2 \geq 2$. There are $m+2$ patterns and $(q_1+q_2+m)$ bins. The seed pattern search is for a pattern that can be produced $(q_1+q_2+p)$ times ($p \geq 1$). If such a seed pattern can be found, then the same bin-packing problem needs to be solved with:

$$(q_1+q_2+m)-(q_1+q_2+p)=m-p$$

bins. The number of pattern reductions is:

$$\Delta=(m+2)-(1+m-p)=1+p$$

The embodiment achieves a reduction by at least two patterns for the two-surplus-pattern scenario, which involves solving $O(n^2)$ sub-problems.

Embodiments also include the above embodiments being generalised such that the common multiplicity of the m patterns is greater than one.

Preferably, after every transformation according to embodiments a check is performed to determine whether the bin-packing solution contains duplicate patterns and whether any newly-created pattern matches an existing one from the rest of the solution. A merge operation is performed if any two or more patterns are the same or otherwise equivalent.

Following each transformation of a subset of patterns according to embodiments, cutting data for a cutting operation is generated as comprising the transformed subset of patterns as well as the patterns in the original cutting data that were not included in the subset that was transformed. Preferably, one or more known transforms are then applied to the newly generated cutting data, such as the 2:1 transform and staircase transform.

The cutting data comprising new patterns created according to embodiments can be evaluated against the specified practical constraints for a particular cutting operation, such as the practical constraints disclosed in the background section of the present document, and rejected if the constraints are not complied with.

A repeat process for repeatedly applying a transformation according to embodiments may be defined in pseudo-code as:

```
repeat
    if kbp_solution_found then
        update solution
        no_more := false
    else
        no_more := true
until no_more
```

An improvement to the above pseudo-code comprises not re-examining subsets that have not changed if a reduction is found and the process started again. Because each reduction creates a new pattern with higher multiplicity, the transformation operations according to embodiments are preferably structured to start the search using the patterns with the lowest multiplicity first.

Embodiments include repeatedly applying the subset determinations and transformations of embodiments to cutting data that has already been generated from a subset determination and transformation according to an embodiment.

The algorithms according to embodiments can be implemented by any computing device. The computing device would receive, or otherwise obtain, initial cutting data that comprises a plurality of patterns. The initial cutting data will have been generated in dependence on cutting parameters that include the dimensions of a large reel of material to be cut and the quantity and widths of items that the large reel of material is to be cut into. The initial cutting data will have also preferably been generated using a known algorithm for minimising wastage of material and also subjected to one or more known transformations, such as the 2:1 transform and staircase transform. The computing device runs the algorithm according to embodiments to transform the cutting data into cutting data with a lower number of patterns.

To implement the algorithms according to embodiments, one or more of the algorithms would typically be executed on cutting data for predetermined time, such as 30 or 60 seconds, and/or until a reduction in the number of patterns is achieved, such as one reduction. As demonstrated by the later results, the algorithms can often determine a reduction in the number of patterns within a few seconds and so they can be quickly used when there are last minute changes to the items required to be cut during a cutting operation.

The cutting data generated according to embodiments is used to configure a known cutting machine that is configurable to cut material in accordance with the patterns in the cutting data. The cutting machine may comprise the computing device used to run algorithms according to embodiments or the computing device may be a remote entity from the cutting machine and the cutting data transmitted to the cutting machine.

The material that is cut by the cutting machine may be paper, film, fabric, a plastic material or any other reel of material, or sheet material, suitable for cutting in accordance with patterns by a cutting machine.

Figure 9:
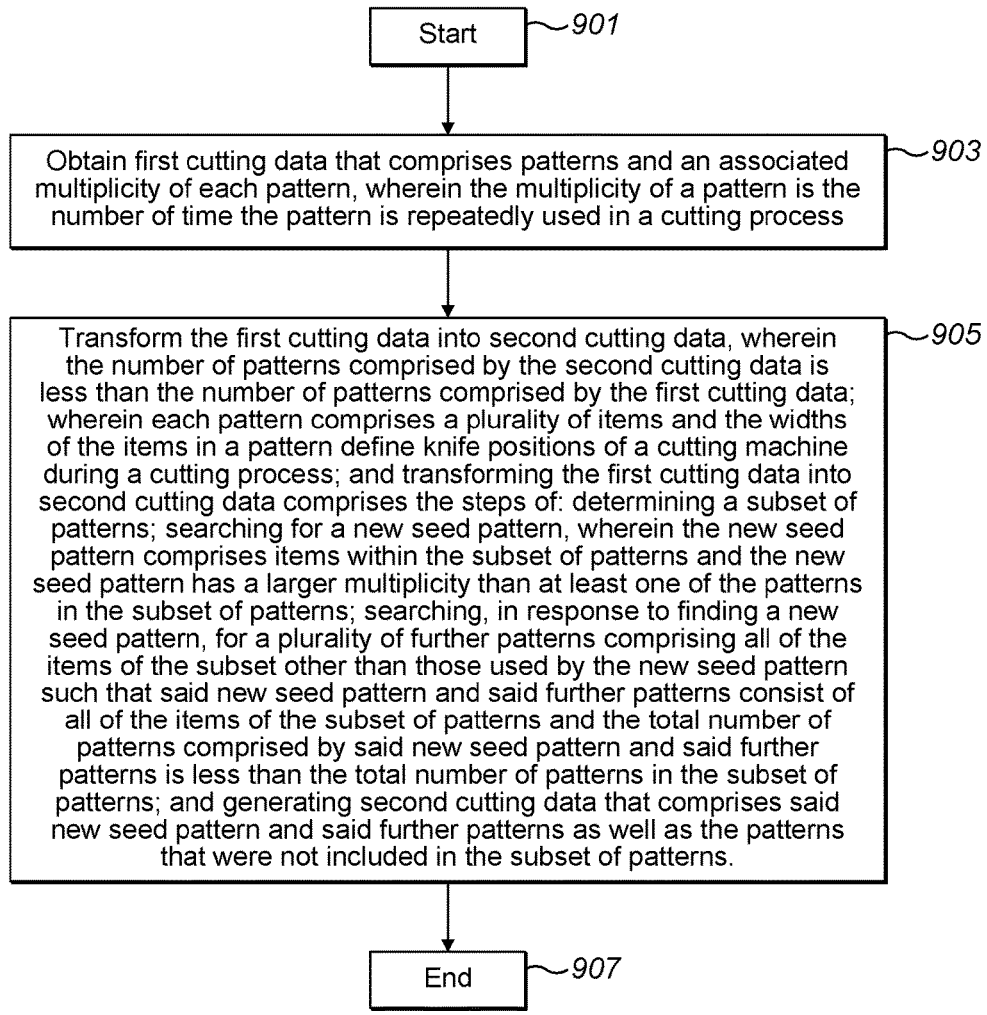
FIG. 9 is a flowchart showing a method according to an embodiment.

FIG. 9 is a flowchart of a process according to an embodiment.

In step 901, the process begins.

In step 903, first cutting data is obtained that comprises patterns and an associated multiplicity of each pattern, wherein the multiplicity of a pattern is the number of times the pattern is repeatedly used in a cutting process.

In step 905, the first cutting data is transformed into second cutting data, wherein the number of patterns comprised by the second cutting data is less than the number of patterns comprised by the first cutting data; wherein each pattern comprises a plurality of items and the widths of the items in a pattern define knife positions of a cutting machine during a cutting process; and transforming the first cutting data into second cutting data comprises the steps of: determining a subset of patterns; searching for a new seed pattern, wherein the new seed pattern comprises items within the subset of patterns and the new seed pattern has a larger multiplicity than at least one of the patterns in the subset of patterns; searching, in response to finding a new seed pattern, for a plurality of further patterns comprising all of the items of the subset other than those used by the new seed pattern such that said new seed pattern and said further patterns consist of all of the items of the subset of patterns and the total number of patterns comprised by said new seed pattern and said further patterns is less than the total number of patterns in the subset of patterns; and generating second cutting data that comprises said new seed pattern and said further patterns as well as the patterns that were not included in the subset of patterns.

In step 907, the process ends.

Some results demonstrating the performance of algorithms according to embodiments are provided below.

The results provided herein for demonstrating the performance of embodiments have been generated by conventional dynamic programming recursion. In addition to being very simple, this has the benefit that all the solutions for the permissible range of maximum widths, as specified by Eqn. 2, can be extracted from the final table. In a pre-processing step, all the sizes are divided by their greatest common divisor. For example, if all sizes including the master size are a multiple of 5 then dividing by 5 reduces the size of the dynamic programming table and therefore the time to solve the knapsack problem. In a second pre-processing step, for each sub-problem for multiplicity k, the pattern multiplicities are divided by k.

For the bin packing problem, the results herein were generated using the improved bin completion algorithm as described in Korf, R. E., An improved algorithm for optimal bin packing, Proceedings of the International Joint Conference on Artificial Intelligence, pp. 1252-1258, Acapulco, 2003. This algorithm is optimal and has proven competitive in large-scale testing. It uses a branch-and-bound search where each new node corresponds to a full bin added to the partial solution. Two key elements of this algorithm are the efficient generation of non-dominated bins and the nogood dominance pruning strategy.

Embodiments of the KBP algorithm may use a number of alternative known algorithms to solve the bin-packing and/or the knapsack problems. Preferably, fast optimal algorithms are used for these steps.

The algorithm examines each subset with a common multiplicity in turn. For each subset, it attempts to find reductions without using a surplus pattern. Once these have been exhausted, it tries surplus patterns. If a reduction is found, it starts again. Otherwise, it moves to the next subset.

For the test data used to generate the results the time taken by the KBP heuristic according to embodiments was so short that it was not necessary to parallelise the code.

The results have been generated from 120 test instances designed to mimic the type of problems encountered in actual cutting operations. The number of patterns varies from 10 to 100 and the number of distinct sizes ranges from 14 to 86. The total number of patterns is 4,104. The only practical constraints considered are (a) minimum pattern width and (b) number of knives.

The starting solutions have been pre-processed known transformations.

Nine experiments were conducted in two dimensions. In the first dimension the time limit per instance t was varied from $\{\infty, 5, 1\}$ seconds, on an Intel i7-4510U CPU @ 2.0 GHz processor with 8 GB of RAM. The time limit was used as a restriction of instances that may take a very long time to solve fully due to the unbalanced nature of the complexity required to solve a problem.

For the second dimension, $\{0, 1, 2\}$ surplus patterns were included in the subsets.

Each experiment applied the KBP heuristic of embodiments to the 120 instances.

The table below shows results for when there were no surplus patterns and the subset comprised patterns with the same multiplicity. 'Reducible instances' shows the number of instances for which a reduction was found. 'Reductions' is the improvement in the total number of patterns, expressed as an absolute number and also as a percentage of the original (4,104). Finally, the table contains the total and average execution times in seconds.

| | Time limit (s) | | |
|---|---|---|---|
| | $\infty$ | 5 | 1 |
| Reducible instances | 39 | 36 | 35 |
| Reductions (patterns) | 148 | 138 | 130 |
| Reductions (%) | 3.6 | 3.4 | 3.2 |
| Total time (s) | 33 | 18 | 6 |
| Average time (s) | 0.28 | 0.15 | 0.05 |

The KBP heuristic/algorithm according to embodiments found improvements in over ¼ of the 120 instances in all three experiments.

The average execution time reported above is a bit misleading because the execution time was less than one second in all but three instances. For the t=$\infty$ case, these three instances consumed 87% of the total time. They exhibit the following trade-off between execution time and reductions ($m_0$ is the initial number of patterns):

| | | Time (s) | | | Reductions | | |
|---|---|---|---|---|---|---|---|
| Instance | $m_0$ | $\infty$ | 5 | 1 | $\infty$ | 5 | 1 |
| 010 | 49 | 10 | 5 | 1 | 3 | 0 | 0 |
| 088 | 23 | 10 | 5 | 1 | 1 | 0 | 0 |
| 118 | 73 | 8 | 5 | 1 | 6 | 0 | 0 |
| Total | 145 | 29 | 14 | 3 | 10 | 0 | 0 |

It can be observed that all problems solve very quickly except for a small number that require a lot more computational resources. In all cases, the solution of the bin packing sub-problems took more than 95% of the execution time. In terms of the type of reduction found, most of the benefits are found for low values of the multiplicity k.

The repeated application of the algorithm to the same initial subset of patterns was shown to improve the results. For example, for test data 085 starting with 16 patterns with multiplicity one, three reductions are achieved. 'Chain' effects are noticeable also: in the same instance, the 3 reductions for k=1, increase the population of patterns with multiplicity k=2 (by three), which are then reduced from 16 to 12 in two further reductions.

Another way to view the results is to examine the statistical relationship between the number of sizes and the number of patterns as shown in FIG. 4. The crosses in FIG. 4 show results prior to a transformation and the dots show results after a transformation according to embodiments. The KBP heuristic had a computational budget of 1 sec per instance.

Figure 5:
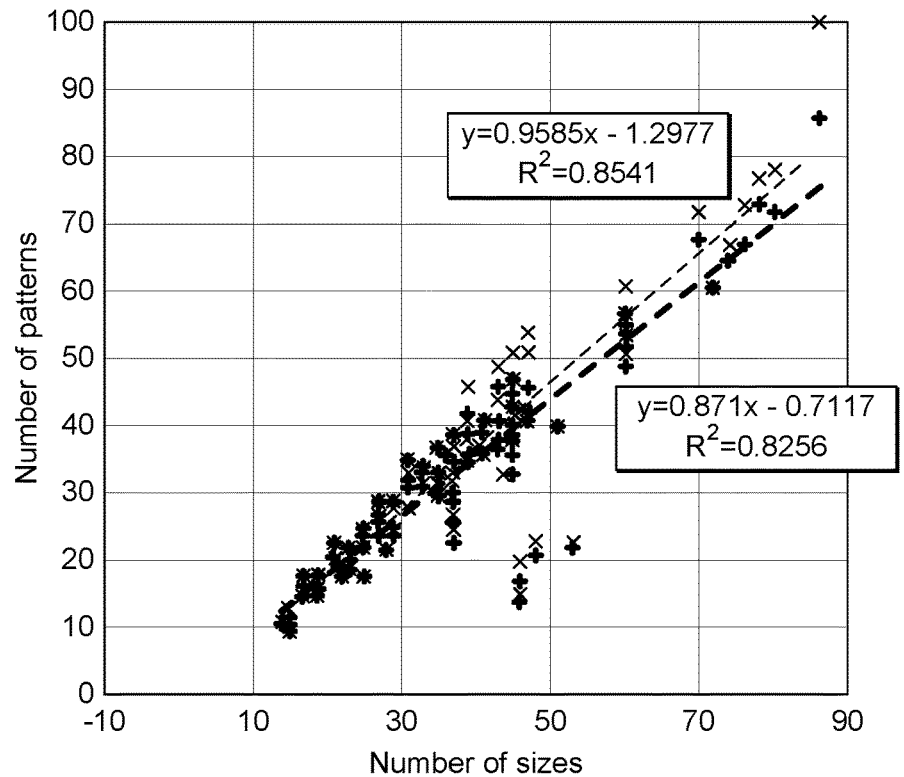
FIG. 5 shows performance results of algorithms according to embodiments.

FIG. 5 shows the results when the computational budget was increased to 33 seconds. The statistical behaviour remains almost the same.

The following results demonstrate the reduction of patterns when one surplus pattern is used. The algorithms according to embodiments are applied to test data 001, with an initial pattern count of 44. The algorithm operates on a subset comprising the 9 patterns with multiplicity one:

1×: 1475+1445+1445+1235
1×: 1475+1475+1475+1175
1×: 1890+1595+1190+920
1×: 2120+1400+1160+920
1×: 2150+1775+1670
1×: 2200+1865+1535
1×: 2255+1235+1160+945
1×: 2255+1445+945+945

1×: 2270+1595+920+815
A reduction is found to:
1×: 1475+1445+1445+1235
1×: 1595+1445+1400+1160
1×: 1775+1670+1235+920
1×: 1890+1595+1160+945
1×: 2120+1475+1190+815
1×: 2200+1865+1535
1×: 2270+2150+1175
2×: 2255+1475+945+920

Of these, the last singleton pattern is merged with a copy with multiplicity 3, leaving just 6 singleton patterns.

Then the algorithm operates on a subset of patterns with multiplicity two:
2×: 1775+1475+1175+1175
2×: 1805+1475+1160+1160
2×: 1880+945+935+920+920
2×: 1895+1895+1805
2×: 2120+1400+1145+935
2×: 2120+1880+1595
2×: 2195+1610+980+815
2×: 2210+1895+1495
2×: 2255+1475+945+920
2×: 2270+1235+1160+935
Using the surplus pattern
10×: 2195+1805+1595
these are reduced to:
2×: 1475+1475+1475+1175
2×: 1775+1145+945+920+815
2×: 1880+1880+920+920
2×: 1895+1895+1805
2×: 2120+1160+1160+1160
2×: 2120+1610+935+935
2×: 2210+1895+1495
2×: 2255+1235+1175+935
2×: 2270+1400+980+945
12×: 2195+1805+1595

The search terminates with 41 patterns. Notice how the seed pattern of the first reduction was used in the last reduction and was actually 'consumed' by it.

The overall results for the 120 instances with one surplus pattern are summarised below:

| | Time limit (s) | | |
|---|---|---|---|
| | ∞ | 5 | 1 |
| Reducible instances | 47 | 44 | 41 |
| Reductions (patterns) | 187 | 172 | 154 |
| Reductions (%) | 4.6 | 4.2 | 3.8 |
| Total time (s) | 125 | 28 | 13 |
| Average time (s) | 1.05 | 0.24 | 0.10 |

The availability of the surplus pattern reduces the total pattern count by 0.6%-1.0%.

Figure 6:
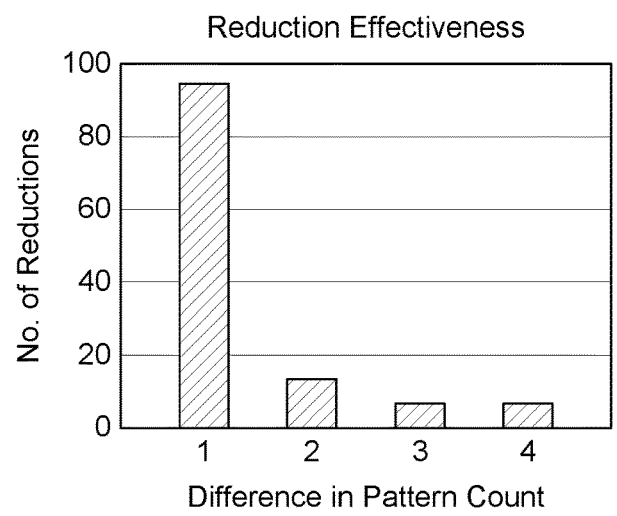
FIG. 6 shows performance results of algorithms according to embodiments.

With the results for t=5, the KBP algorithm according to embodiments reduces the total pattern count by 172 via 123 reductions in 44 problems. The vast majority of the 123 reductions led to a reduction by one pattern, but there were 7 reductions that each achieved a reduction by 4 (in all 7 cases there was a merge operation that contributed). The results are shown in FIG. 6.

Figure 7:
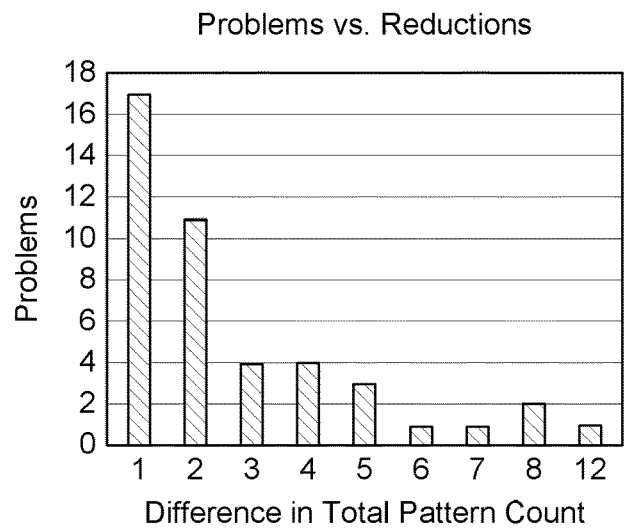
FIG. 7 shows performance results of algorithms according to embodiments.

The 44 problems with an improvement had the distribution shown in FIG. 7.

The additional flexibility offered by the use of the surplus pattern is evident in these results. Of the 123 reductions, 30 involved a surplus pattern; these 30 induced an increase in the total number of reductions from 138 to 172, i.e. 34 fewer patterns in total. This is either because they had a reduction by more than one pattern, or because they triggered further reductions when the process was re-applied.

Figure 8:
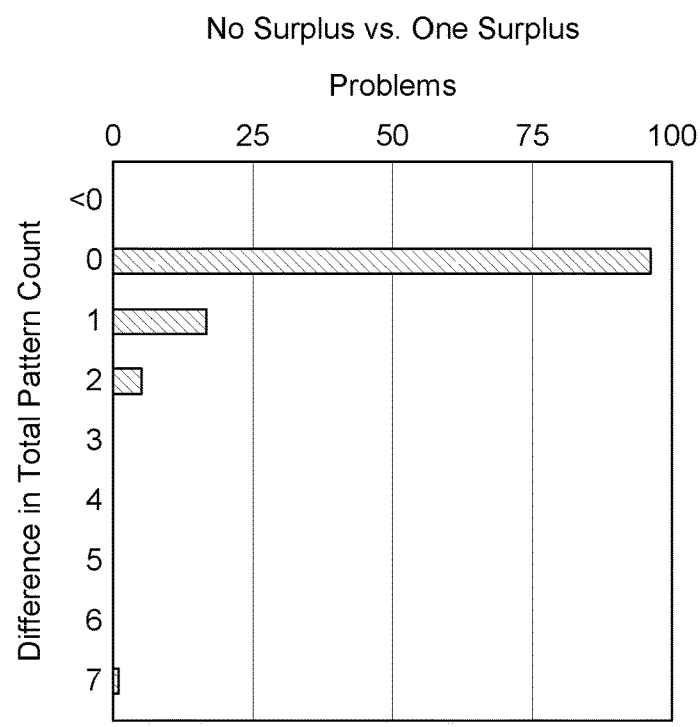
FIG. 8 shows performance results of algorithms according to embodiments.

Comparing with the version without a surplus pattern, the results were uniformly equal or better as shown in FIG. 8.

Using a surplus pattern increases the fraction of amenable instances from 30% to over 37%. The computational cost for this increase is large in relative terms (from 18 to 28 seconds), but remains trivial at an average of 0.24 seconds per problem.

The application of algorithms according to embodiments have been shown to reduce the number of patterns for approximately ⅓ of the instances of cutting data that was tested. The improvement was shown to increase with the size of the problem.

The flowcharts and description thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

Some of the above-described embodiments are described with references to flowcharts and/or block diagrams of methods, apparatuses, and systems. One skilled in the art will appreciate that these can be implemented by computer program instructions. These computer program instructions may be provided to a processor of a general purpose computer(s) or computer system(s), special purpose computer(s) or computer system(s), other programmable data processing apparatus, or the like, to produce a machine, such that the instructions, executed via the processor of the computer (computer system, programmable data processing apparatus, or the like), create mechanisms for implementing the functions specified within the blocks of the flowcharts and/or block diagrams and/or within corresponding portions of the present disclosure.

These computer program instructions may also be stored in a computer-readable memory (or medium) and direct a computer (computer system, programmable data processing apparatus, or the like) to function in a particular manner, such that the instructions stored in the computer readable memory or medium produce an article of manufacture including instruction means which implement the functions specified in the blocks of the flowchart(s) and/or block diagram(s) and/or within corresponding portions of the present disclosure.

One skilled in the art will understand that any suitable computer-readable medium may be utilized. In particular, the computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (HP OM or Flash memory), a compact disc read-only memory (CD-ROM), and/or some other tangible optical and/or magnetic storage device. In other embodiments, the computer-readable medium may be transitory, such as, for example, a propagation signal including computer-executable program code portions embodied therein.

The computer program instructions may also be loaded onto a computer (computer system, other programmable data processing apparatus, or the like) to cause a series of operational steps to be performed on the computer (computer system, other programmable data processing apparatus, or the like) to produce a computer-implemented method or process such that the instructions executed on the computer (computer system, other programmable data processing apparatus, or the like) provide steps for implementing the functions/acts specified in the flowchart and/or block diagram block(s) and/or within corresponding portions of the present disclosure.

In some embodiments of the present disclosure, the above described methods and/or processes could be performed by a program executing in a programmable, general purpose computer or computer system. Alternative embodiments are implemented in a dedicated or special-purpose computer or computer system in which some or all of the operations, functions, steps, or acts are performed using hardwired logic or firmware.

Embodiments include the following numbered clauses:

1. A method of transforming cutting data for configuring a cutting machine for a cutting process, the method comprising a computing device:
   obtaining first cutting data that comprises patterns and an associated multiplicity of each pattern, wherein the multiplicity of a pattern is the number of times the pattern is repeatedly used in a cutting process; and
   transforming the first cutting data into second cutting data, wherein the number of patterns comprised by the second cutting data is less than the number of patterns comprised by the first cutting data;
   wherein each pattern comprises a plurality of items and the widths of the items in a pattern define knife positions of a cutting machine during a cutting process; and
   transforming the first cutting data into second cutting data comprises the steps of:
   determining a subset of patterns;
   searching for a new seed pattern, wherein the new seed pattern comprises items within the subset of patterns and the new seed pattern has a larger multiplicity than at least one of the patterns in the subset of patterns;
   searching, in response to finding a new seed pattern, for a plurality of further patterns comprising all of the items of the subset other than those used by the new seed pattern such that said new seed pattern and said further patterns consist of all of the items of the subset of patterns and the total number of patterns comprised by said new seed pattern and said further patterns is less than the total number of patterns in the subset of patterns; and
   generating second cutting data that comprises said new seed pattern and said further patterns as well as the patterns that were not included in the subset of patterns.

2. The method according to clause 1, further comprising reducing the number of patterns in the second cutting data by repeatedly applying said transformation steps to one or more subsets of generated second cutting data.

3. The method according to clause 1 or 2, wherein said step of determining a subset of patterns comprises determining patterns to be included in the subset of patterns in dependence on the multiplicity of the patterns.

4. The method according to any preceding clause, wherein said step of determining a subset of patterns comprises determining patterns to be included in the subset of patterns in dependence on all of the patterns having the same multiplicity.

5. The method according to any of clauses 1 to 3, wherein said step of determining a subset of patterns comprises:
   determining patterns to be included in the subset of patterns in dependence on patterns having the same multiplicity; and
   in dependence on one or more patterns with larger multiplicity than the patterns with the same multiplicity.

6. The method according to clause 5, wherein the subset comprises a plurality of patterns with the same multiplicity and only one pattern with a larger multiplicity.

7. The method according to any preceding clause, wherein said step of determining a subset of patterns comprises determining the patterns with the lowest multiplicity to be included in the subset of patterns.

8. The method according to any preceding clause, further comprising:
   applying a transformation to a first subset of patterns with a first multiplicity;
   applying a transformation to one or more further subsets of patterns, wherein all of the subsets of patterns have different multiplicities; and
   generating the second cutting data in dependence on the applied transformations to the plurality of subsets of patterns.

9. The method according to clause 8, further comprising applying the transformations to the plurality subsets of patterns in a parallel computing process.

10. The method according to any preceding clause, wherein the transformation further comprises determining if said further patterns comprise the same pattern more than once and/or the same pattern as said new seed pattern; and
    merging any patterns that are determined to be the same to generate a single pattern with larger multiplicity than that of the same patterns.

11. The method according to any preceding clause, wherein the transformation further comprises applying one or more additional transformations.

12. The method according to clause 11, wherein the additional transformations include one or both of the 2:1 transformation and staircase transformation.

13. The method according to any preceding clause, wherein searching for a new seed pattern comprises using a knapsack algorithm.

14. The method according to any preceding clause, wherein searching for a plurality of further patterns comprises using a bin packing algorithm.

15. The method according to any preceding clause, further comprising:
    receiving the first cutting data; and
    outputting the second cutting data.

16. The method according to any preceding clause, further comprising receiving cutting parameters that comprise the width of a material to be cut during the cutting process and the widths and quantities of items that the material is to be cut into; and
    generating first cutting data in dependence on the received cutting parameters.

17. The method according to any preceding clause, wherein the first cutting data is generated in dependence on an algorithm for minimising the wastage of the material being cut.
18. The method according to any preceding clause, wherein the first cutting data has been transformed by the 2:1 transform and/or the staircase transform.
19. The method according to any preceding clause, wherein the material is paper, film or fabric.
20. The method according to any preceding clause, wherein the multiplicity of the patterns in the subset of patterns is one.
21. The method according to any preceding clause, wherein searching for a new seed pattern comprises first searching for a seed pattern that has a maximum potential multiplicity; and
    searching for seed patterns with sequentially lower multiplicity in the event that a plurality of further patterns comprising all of the items of the subset other than those used by the new seed pattern, such that said new seed pattern and said further patterns consist of all of the items of the subset of patterns and the total number of patterns comprised by said new seed pattern and said further patterns is less than the total number of patterns in the subset of patterns, is not found.
22. The method according to any preceding clause, wherein the subset is either:
    a subset of the patterns comprised by the first cutting data and the subset comprises less patterns than the number of patterns comprised by the first cutting data; or
    a subset of patterns comprised by second cutting data generated by a previous transformation and the subset comprises less patterns than the number of patterns comprised by the second cutting data.
23. The method according to any preceding clause, further comprising stopping a transformation after a predetermined time has elapsed since the transformation started.
24. The method according to any preceding clause, further comprising determining to stop all current transformations and to not perform further transformations on cutting data after a predetermined time has elapsed since a first transformation was started.
25. The method according to any preceding clause, further comprising determining to stop all current transformations and to not perform further transformations on cutting data when a predetermined reduction in the number of patterns comprised by the cutting data has been reached.
26. The method according to any preceding clause, wherein the transformation of the first cutting data into second cutting data provides the same quantities of each item in the second cutting data as in the first cutting data.
27. The method according to any preceding clause, wherein the wastage of material as a result of a cutting operation that is performed according to the first cutting data is the same as the wastage of material as a result of a cutting operation performed according to the second cutting data.
28. The method according to any preceding clause, wherein the new seed pattern has a larger multiplicity than all of the patterns in the subset of patterns;
29. A method of operating a cutting machine comprising: receiving a reel of material to be cut;
    obtaining cutting data that has been generated in dependence on the method according to any preceding clause;
    configuring the machine with the obtained cutting data; and
    operating the configured machine to cut said reel into a plurality of smaller reels in dependence on the obtained cutting data.
30. A computing device configured to automatically perform the method of any of clauses 1 to 28.
31. A cutting machine for cutting a reel of material into a plurality of smaller reels of material, wherein the cutting machine is configured to:
    receive cutting data from a computing device according to clause 30; and
    cut a reel of material into a plurality of smaller reels in dependence on the cutting data.
32. A cutting system comprising a cutting machine according to clause 31 and a computing device according to clause 30.

The invention claimed is:

1. A method of transforming cutting data for configuring a cutting machine for a cutting process, the method comprising a computing device:
    obtaining first cutting data that comprises patterns and an associated multiplicity of each pattern, wherein the multiplicity of a pattern is the number of times the pattern is repeatedly used in a cutting process;
    and transforming the first cutting data into second cutting data, wherein the number of patterns comprised by the second cutting data is less than the number of patterns comprised by the first cutting data;
    wherein each pattern comprises a plurality of items and the widths of the items in a pattern define knife positions of a cutting machine during a cutting process; and
    transforming the first cutting data into second cutting data comprises the steps of:
    determining a subset of patterns;
    searching for a new seed pattern, wherein the new seed pattern comprises items within the subset of patterns and the new seed pattern has a larger multiplicity than at least one of the patterns in the subset of patterns;
    searching, in response to finding a new seed pattern, for a plurality of further patterns comprising all of the items of the subset other than those used by the new seed pattern such that said new seed pattern and said further patterns consist of all of the items of the subset of patterns and the total number of patterns comprised by said new seed pattern and said further patterns is less than the total number of patterns in the subset of patterns;
    and generating second cutting data that comprises said new seed pattern and said further patterns as well as the patterns that were not included in the subset of patterns;
    reducing the number of patterns in the second cutting data by repeatedly applying said transformation steps to one or more subsets of generated second cutting data;
    and operating the cutting machine comprising:
    receiving a reel of material to be cut;
    obtaining the second cutting data that has been generated in dependence on the method of transforming cutting data;
    configuring the machine with the obtained second cutting data; and
    operating the configured machine to cut said reel into a plurality of smaller reels in dependence on the obtained second cutting data.

2. The method according to claim 1, wherein said step of determining a subset of patterns comprises determining patterns to be included in the subset of patterns in dependence on the multiplicity of the patterns.

3. The method according to claim 1, wherein said step of determining a subset of patterns comprises determining patterns to be included in the subset of patterns in dependence on all of the patterns having the same multiplicity.

4. The method according to claim 1, wherein said step of determining a subset of patterns comprises:
determining patterns to be included in the subset of patterns in dependence on patterns having the same multiplicity; and
in dependence on one or more patterns with larger multiplicity than the patterns with the same multiplicity.

5. The method according to claim 4, wherein the subset comprises a plurality of patterns with the same multiplicity and only one pattern with a larger multiplicity.

6. The method according to claim 1, wherein said step of determining a subset of patterns comprises determining the patterns with the lowest multiplicity to be included in the subset of patterns.

7. The method according to claim 1, further comprising:
applying a transformation to a first subset of patterns with a first multiplicity;
applying a transformation to one or more further subsets of patterns, wherein all of the subsets of patterns have different multiplicities; and
generating the second cutting data in dependence on the applied transformations to the plurality of subsets of patterns.

8. The method according to claim 1, further comprising applying the transformations to the plurality subsets of patterns in a parallel computing process.

9. The method according to claim 1, wherein the transformation further comprises determining if said further patterns comprise the same pattern more than once and/or the same pattern as said new seed pattern; and
merging any patterns that are determined to be the same to generate a single pattern with larger multiplicity than that of the same patterns.

10. The method according to claim 1, wherein the transformation further comprises applying one or more additional transformations.

11. The method according to claim 10, wherein the additional transformations include one or both of the 2:1 transformation and staircase transformation.

12. The method according to claim 1, wherein searching for a new seed pattern comprises using a knapsack algorithm.

13. The method according to claim 1, wherein searching for a plurality of further patterns comprises using a bin packing algorithm.

14. The method according to claim 1, further comprising:
receiving the first cutting data; and
outputting the second cutting data.

15. The method according to claim 1, further comprising receiving cutting parameters that comprise the width of a material to be cut during the cutting process and the widths and quantities of items that the material is to be cut into; and
generating first cutting data in dependence on the received cutting parameters.

16. The method according to claim 1, wherein the first cutting data is generated in dependence on an algorithm for minimising the wastage of the material being cut.

17. The method according to claim 1, wherein the first cutting data has been transformed by the 2:1 transform and/or the staircase transform.

18. The method according to claim 15, wherein the material is paper, film or fabric.

19. The method according to claim 1, wherein the multiplicity of the patterns in the subset of patterns is one.

20. The method according to claim 1, wherein searching for a new seed pattern comprises first searching for a seed pattern that has a maximum potential multiplicity; and
searching for seed patterns with sequentially lower multiplicity in the event that a plurality of further patterns comprising all of the items of the subset other than those used by the new seed pattern, such that said new seed pattern and said further patterns consist of all of the items of the subset of patterns and the total number of patterns comprised by said new seed pattern and said further patterns is less than the total number of patterns in the subset of patterns, is not found.

21. The method according to claim 1, wherein the subset is either:
a subset of the patterns comprised by the first cutting data and the subset comprises less patterns than the number of patterns comprised by the first cutting data; or
a subset of patterns comprised by second cutting data generated by a previous transformation and the subset comprises less patterns than the number of patterns comprised by the second cutting data.

22. The method according to claim 1, further comprising stopping a transformation after a predetermined time has elapsed since the transformation started.

23. The method according to claim 1, further comprising determining to stop all current transformations and to not perform further transformations on cutting data after a predetermined time has elapsed since a first transformation was started.

24. The method according to claim 1, further comprising determining to stop all current transformations and to not perform further transformations on cutting data when a predetermined reduction in the number of patterns comprised by the cutting data has been reached.

25. The method according to claim 1, wherein the transformation of the first cutting data into second cutting data provides the same quantities of each item in the second cutting data as in the first cutting data.

26. The method according to claim 1, wherein the wastage of material as a result of a cutting operation that is performed according to the first cutting data is the same as the wastage of material as a result of a cutting operation performed according to the second cutting data.

27. The method according to claim 1, wherein the new seed pattern has a larger multiplicity than all of the patterns in the subset of patterns.

28. A cutting system comprising:
the computing device configured to automatically perform the method of claim 1;
the cutting machine for cutting the reel of material into the plurality of smaller reels of material, wherein the cutting machine is configured to:
receive the second cutting data from the computing device according to claim 1;
and cut the reel of material into the plurality of smaller reels in dependence on the second cutting data.

* * * * *